United States Patent
Xue

(10) Patent No.: US 10,176,811 B2
(45) Date of Patent: Jan. 8, 2019

(54) NEURAL NETWORK-BASED VOICEPRINT INFORMATION EXTRACTION METHOD AND APPARATUS

(71) Applicant: Alibaba Group Holding Limited, Grand Cayman (KY)

(72) Inventor: Shaofei Xue, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 15/621,162

(22) Filed: Jun. 13, 2017

(65) Prior Publication Data
US 2017/0358306 A1 Dec. 14, 2017

(30) Foreign Application Priority Data
Jun. 13, 2016 (CN) .......................... 2016 1 0421908

(51) Int. Cl.
| | | |
|---|---|---|
| G10L 17/04 | (2013.01) | |
| G10L 17/18 | (2013.01) | |
| G10L 15/06 | (2013.01) | |
| G10L 17/02 | (2013.01) | |

(52) U.S. Cl.
CPC ............ G10L 17/04 (2013.01); G10L 15/063 (2013.01); G10L 17/02 (2013.01); G10L 17/18 (2013.01)

(58) Field of Classification Search
CPC ....... G10L 17/18; G10L 15/063; G10L 15/16; G10L 17/02; G10L 17/04; G10L 15/02
See application file for complete search history.

(56) References Cited

U.S. PATENT DOCUMENTS

| | | |
|---|---|---|
| 5,133,012 A | 7/1992 | Nitta |
| 8,527,276 B1 * | 9/2013 | Senior .................... G06N 3/084 704/258 |
| 9,401,148 B2 | 7/2016 | Lei et al. |
| 2014/0195236 A1 | 7/2014 | Hosom et al. |
| 2014/0214417 A1 | 7/2014 | Wang et al. |
| 2015/0149165 A1 | 5/2015 | Saon |

(Continued)

OTHER PUBLICATIONS

PCT Search Report and Written Opinion dated Aug. 23, 2017 for PCT appliation No. PCT/S2017/037145, 9 pages.

(Continued)

Primary Examiner — Angela A Armstrong
(74) Attorney, Agent, or Firm — Lee & Hayes, PC

(57) ABSTRACT

A method and an apparatus of extracting voiceprint information based on neural network are disclosed. The method includes: extracting a phonetic acoustic feature from an input voice segment; inputting the phonetic acoustic feature into a voiceprint model trained based on a neural network, and extracting a bottleneck feature of the neural network in the voiceprint model; and mapping frame vectors of the bottleneck feature of the neural network into a single-frame voiceprint expression vector, which serves as voiceprint information corresponding to the input voice segment. The neural network-based voiceprint information extraction method and apparatus extract voiceprint information of a voice segment using a voiceprint model trained based on a neural network, and thus the extraction process is relatively simple, and a short-time voice segment can be processed in a better manner.

20 Claims, 3 Drawing Sheets

(56) References Cited

U.S. PATENT DOCUMENTS

| | | | |
|---|---|---|---|
| 2016/0098987 A1* | 4/2016 | Stolcke | G10L 15/063 |
| | | | 704/232 |
| 2017/0040016 A1* | 2/2017 | Cui | G10L 15/063 |
| 2017/0206892 A1* | 7/2017 | Doddipatla | G10L 15/063 |
| 2017/0256254 A1* | 9/2017 | Huang | G10L 15/02 |

OTHER PUBLICATIONS

Richardson, et al., "A Unified Deep Neural Network for Speaker and Lanaguage Recognition", retrieved from the internet on Jul. 28, 2017 from URL:https://arxiv.org/pdf/1504.00923.pdf.

* cited by examiner

NEURAL NETWORK-BASED VOICEPRINT INFORMATION EXTRACTION METHOD AND APPARATUS

CROSS REFERENCE TO RELATED PATENT APPLICATION

This application claims foreign priority to Chinese Patent Application No. 201610421908.9 filed on Jun. 13, 2016, entitled "Neural Network-Based Voiceprint Information Extraction Method and Apparatus", which is hereby incorporated by reference in its entirety.

TECHNICAL FIELD

The present disclosure relates to the field of computers, and in particular, to methods and apparatuses of extracting voiceprint information based on a neural network.

BACKGROUND

Voiceprint information generally refers to information that is capable of representing a speaker, and is a type of voice information that reflects physiological and behavior characteristics of the speaker through voice waveforms. The voiceprint information may be broadly applied to tasks such as speaker recognition, speaker verification, and speaker self-adaptation in speech recognition. Rapid and effective extraction of voiceprint information is very important for improving the performance of the foregoing tasks.

I-vector is a mainstream technology of speaker recognition. In i-vector, each speaker has a vector that is distinguishable from among different speakers.

Generally, i-vector needs to model a speaker space and a channel space separately, and substitute a changing factor for computation, and thereby a vector representing voiceprint information can be extracted from an input voice. The processes of training and voiceprint information extraction thereof are relatively complicated.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a method and an apparatus of extracting voiceprint information based on a neural network, to simplify a process of extracting the voiceprint information.

In implementations, the present disclosure provides a neural network-based voiceprint information extraction method. The method may include extracting one or more phonetic acoustic features from an input voice segment; inputting the one or more phonetic acoustic features into a voiceprint model trained based on a neural network, and extracting a bottleneck feature of the neural network in the voiceprint model; and mapping frame vectors of the bottleneck feature of the neural network into a single-frame voiceprint expression vector, to serve as voiceprint information corresponding to the input voice segment.

In implementations, mapping the frame vectors of the bottleneck feature of the neural network into the single-frame voiceprint expression vector may include weighting the frame vectors of the bottleneck feature of the neural network to calculate and obtain the single-frame voiceprint expression vector corresponding to the bottleneck feature of the neural network.

In implementations, mapping the frame vectors of the bottleneck feature of the neural network into the single-frame voiceprint expression vector may include constructing an i-vector model for the frame vectors of the bottleneck feature of the neural network, and calculating the single-frame voiceprint expression vector corresponding to the bottleneck feature of the neural network using the i-vector model.

In implementations, the method may further include training the neural network, which includes using phonetic acoustic features extracted from training voice segments as input data of the neural network; using classification labels corresponding to the training voice segments as output data of the neural network; and classifying the input data through the neural network and comparing correspondence relationships between classification results and the output data to train the voiceprint model.

In implementations, the neural network may include an input layer, a bidirectional recurrent neural network layer, a fully connected layer, and an output layer, in a sequence order from the bottom onwards.

In implementations, the neural network may include an input layer, a bidirectional recurrent neural network layer, a convolutional neural network layer, a fully connected layer, and an output layer, in a sequence order from the bottom onwards.

In implementations, the bottleneck feature of the neural network may include an output of a phonetic acoustic feature in the fully connected layer of the voiceprint model.

In implementations, the present disclosure further provides a neural network-based voiceprint information extraction apparatus. The apparatus may include a phonetic acoustic feature extraction module configured to extract one or more phonetic acoustic features from an input voice segment; a processing module configured to input the one or more phonetic acoustic features into a voiceprint model trained based on a neural network, and extract a bottleneck feature of the neural network in the voiceprint model; and a voiceprint information calculation module configured to map frame vectors of the bottleneck feature of the neural network into a single-frame voiceprint expression vector, to serve as voiceprint information corresponding to the input voice segment.

In implementations, the voiceprint information calculation module may further be configured to weight the frame vectors of the bottleneck feature of the neural network to calculate and obtain the single-frame voiceprint expression vector corresponding to the bottleneck feature of the neural network.

In implementations, the voiceprint information calculation module may further be configured to construct an i-vector model for the frame vectors of the bottleneck feature of the neural network, and calculate the single-frame voiceprint expression vector corresponding to the bottleneck feature of the neural network using the i-vector model.

In implementations, the apparatus may further include a neural network training module configured to use a phonetic acoustic feature extracted from a training voice segment as input data of the neural network; use a classification label corresponding to the training voice segment as output data of the neural network; and classify the input data using the neural network, and train the voiceprint model by comparing a correspondence relationship between a classification result and the output data.

In implementations, the neural network may include an input layer, a bidirectional recurrent neural network layer, a fully connected layer, and an output layer, in a sequence order from the bottom onwards.

In implementations, the neural network may include an input layer, a bidirectional recurrent neural network layer, a convolutional neural network layer, a fully connected layer, and an output layer, in a sequence order from the bottom onwards.

In implementations, the bottleneck feature of the neural network may include an output of a phonetic acoustic feature in the fully connected layer of the voiceprint model.

Compared with existing technologies, the neural network-based voiceprint information extraction method and apparatus extract voiceprint information of a voice segment through a voiceprint model that is trained based on a neural network, having a relatively simple extraction process, which can process a short-time voice segment in a better way.

DETAILED DESCRIPTION

The present disclosure will be described in detail hereinafter with reference to exemplary implementations as shown in the accompanying drawings. These implementations, however, are not intended to limit the present disclosure. One of ordinary skill in the art may make changes to structures, methods or functions based on these implementations, and these changes should all fall within the scope of protection of the present disclosure.

A voiceprint is an acoustic wave spectrum carrying verbal information displayed by an electro-acoustic instrument. Generation of a human language is a complicated physiological and physical process between a language center and vocal organs of a human body. The vocal organs (tongue, teeth, throat, lung, and nasal cavity) used when people speak vary significantly from person to person in terms of size and form, and therefore voiceprints of any two persons are different.

Voiceprint information is information that is extracted by means of a filter, a model, etc., which is representative of a speaker and possesses a highly discriminative voiceprint expression. The voiceprint information may be used by a voiceprint recognition system, i.e., speaker recognition and verification. The former one is used to determine which person from among a plurality of persons is a speaker of a certain speech segment, and is a question of "choosing one from multiple options". The latter one is used to verify whether a segment of speech is spoken by a designated person, and is a "one-to-one discretion" question. Different tasks and applications may use different voiceprint recognition technologies. For example, recognition technologies may be needed to reduce a scope of criminal investigation, and verification technologies is needed when conducting bank transaction.

The voiceprint information may also be used in a speaker self-adaptation system for speech recognition. The speaker self-adaptation system converts a voice feature related to a speaker into a voice feature unrelated to the speaker, or converts a voiceprint model unrelated to a speaker into a voiceprint model related to the speaker, to enable a voice feature of a target speaker to be tested to match a voiceprint model thereof in a better manner, thus obtaining a better recognition effect. An important approach that achieves these conversions is to extract voiceprint information of a voice of a speaker.

The present disclosure extracts voiceprint information of a voice using a voiceprint model that is trained based on a neural network. This greatly simplifies processes of extraction and modeling, and the extracted voiceprint information has a relatively high quality.

Figure 1:
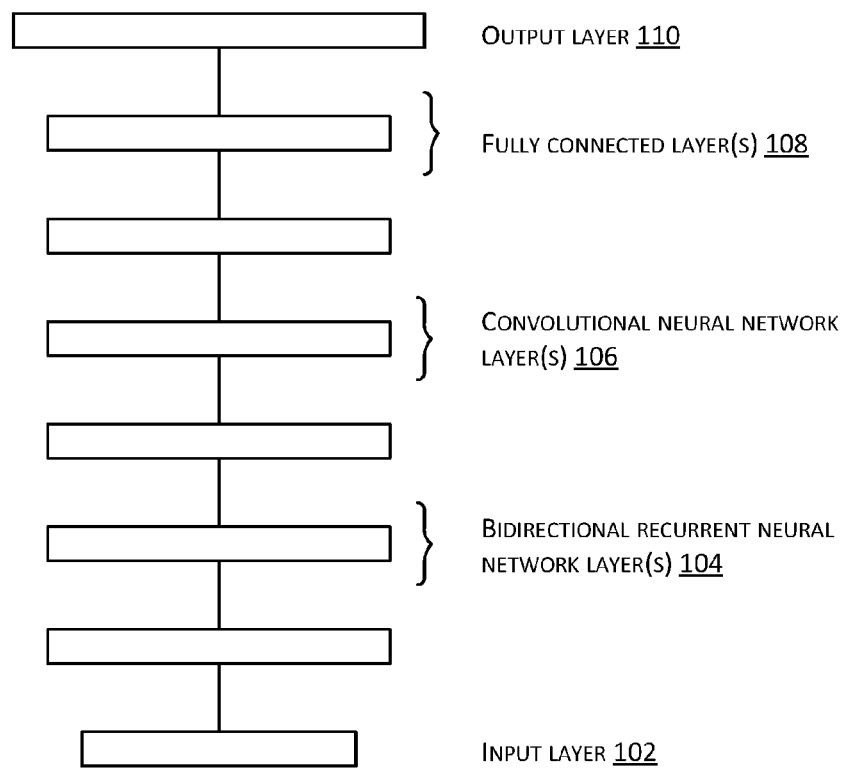
FIG. 1 is a structural diagram of a voiceprint model according to an embodiment of the present disclosure.

FIG. 1 shows a voiceprint model for extracting voiceprint information. The voiceprint model is trained based on a neural network 100 in accordance with the present disclosure. In implementations, according to a sequential order starting from the bottom onwards, the neural network 100 may include an input layer 102, one or more bidirectional recurrent neural network layers 104, one or more fully connected layers 108, and an output layer 110. In other words, data entering the neural network 100 passes through the input layer 102, the one or more bidirectional recurrent neural network layers 104, the one or more fully connected layers 108, and the output layer 110 successively. In implementations, a fully connected layer includes at least one layer of fully connected network.

In an implementation, the neural network may employ a bidirectional recurrent neural network layer (a bidirectional RNN), i.e., a BLSTM network including a forward propagation layer and a backward propagation layer. Therefore, a phonetic acoustic feature of a current time frame is analyzed using forward and backward time frames together in a complete time sequence, such that a bottleneck feature of the neural network extracted in the voiceprint model is more accurate.

In another implementation, according to a sequential order starting from the bottom onwards, the neural network 100 may include an input layer 102, one or more bidirectional recurrent neural network layers 104, one or more convolutional neural network layers 106, one or more fully connected layers 108, and an output layer 110. In other words, data entering the neural network 100 passes successively through the input layer 102, the one or more bidirectional recurrent neural network layers 104, the one or more convolutional neural network layers 106, the one or more fully connected layers 108, and the output layer 110.

The current implementation further adds a convolutional neural network layer (CNN) 106 on the basis of the previous implementation, and may combine phonetic acoustic features of multiple frames into a fewer number of frames, thus reducing the frame rate in this way, such that a better bottleneck feature of the neural network may be extracted at a later stage.

One skilled in the art can know and get familiar with the network structures and characteristics involved in various layers in the foregoing neural network architecture, such as the bidirectional recurrent neural network, the convolutional neural network, and the fully connected network, using the existing technologies, and thus details thereof are not redundantly described herein. How to extract voiceprint information based on a neural network is described hereinafter.

Furthermore, before voiceprint information is extracted, the neural network needs to be trained first. In an implementation, GPU acceleration is used to train the neural network into a voiceprint model. A method thereof may include using phonetic acoustic features extracted from training voice segments as input data of the neural network; using classification labels corresponding to the training voice segments as output data of the neural network; and classifying the input data using the neural network, and training the voiceprint model by comparing correspondence relationships between classification results and the output data.

In implementations, a speaker is used as a classification label, that is, one speaker corresponds to at least one training voice segment. An approach of training the neural network may include inputting a large number of training voice segments into the neural network and performing classification by the neural network; marking a classification as one if the neural network classifies a training voice segment into a corresponding speaker (i.e., a classification result corresponds to output data); marking the classification as zero if the neural network fails to classify the training voice segment into the corresponding speaker (i.e., the classification result does not correspond to the output data); and substituting the input data into the neural network again with reference to classification labels for analytic training, after all the training voice segments are classified in this manner, until the neural network can perform classification accurately or a classification accuracy thereof exceeds a preset threshold, and then setting the neural network as a voiceprint model.

Figure 2:
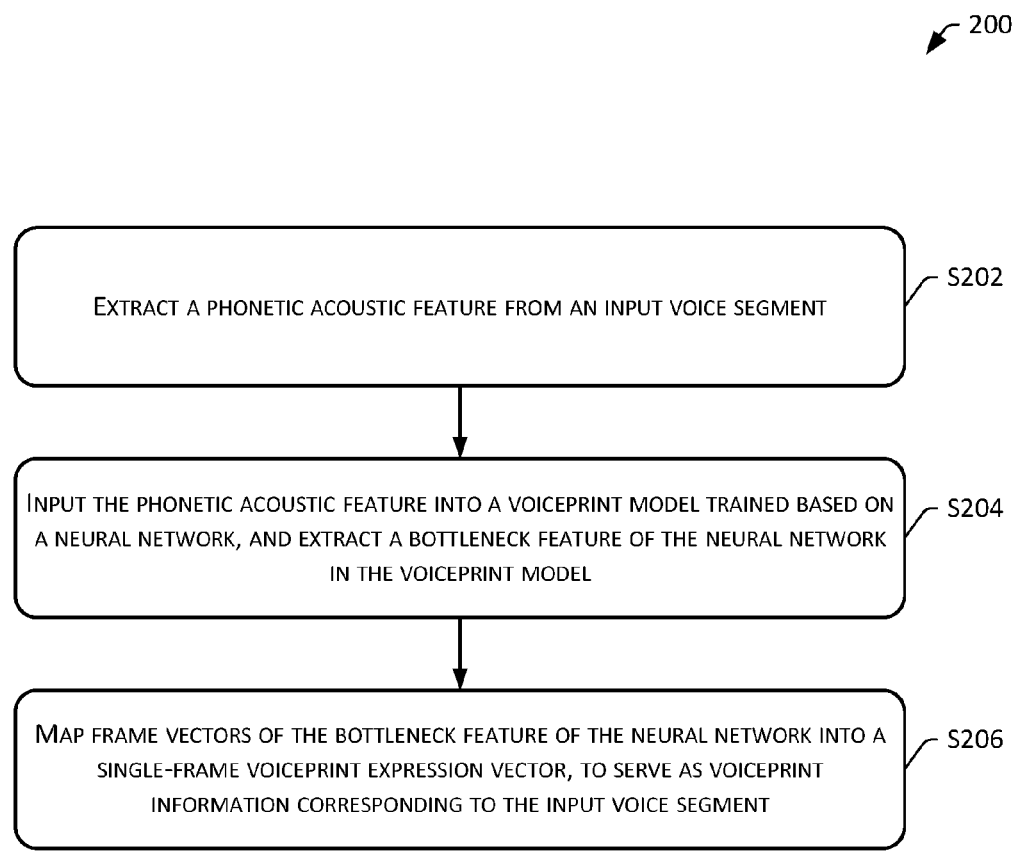
FIG. 2 is a flowchart of a neural network-based voiceprint information extraction method according to an embodiment of the present disclosure.

As shown in FIG. 2, in implementations, a neural network-based voiceprint information extraction method 200 may include the following operations.

S202 extracts a phonetic acoustic feature from an input voice segment.

S204 inputs the phonetic acoustic feature into a voiceprint model trained based on a neural network, and extracts a bottleneck feature of the neural network in the voiceprint model.

S206 maps frame vectors of the bottleneck feature of the neural network into a single-frame voiceprint expression vector, to serve as voiceprint information corresponding to the input voice segment.

In implementations, the voice segment may include a section of continuous speech, for example, a sentence, a paragraph, and the like. The phonetic acoustic feature may include a Mel Frequency Cepstrum Coefficient (MFCC), a Perceptual Linear Prediction (PLP) Coefficient, a Filter Bank Feature, etc., of the voice segment. Apparently, the phonetic acoustic feature may also be original or raw speech data of the voice segment.

After the extracted phonetic acoustic feature corresponding to the voice segment is inputted into the voiceprint model, the voiceprint model may process the phonetic acoustic feature according to one or more rules that are defined in the previous training. For example, the phonetic acoustic feature sequentially passes through the input layer, the one or more bidirectional recurrent neural network layers, the one or more convolutional neural network layers, and the one or more fully connected layers for analysis.

In implementations, for the voice segment from which voiceprint information needs to be extracted, the extracted feature is a bottleneck feature of the neural network, for example, an output of a fully connected layer in the voiceprint model. In implementations, when the neural network is trained, a particular layer may be selected to include a number of nodes fewer than other layers in the neural network. For example, the particular layer may include a few hundreds of nodes (such as 200 nodes), and the other layers may include a few thousands of nodes (e.g., 2000 nodes). This particular layer, which is selected to include a fewer number of nodes as compared to those of other layers, is called a bottleneck layer. In implementations, a bottleneck feature is an output of the bottleneck layer, and is taken as a new representation of information represented by a group of features after this group of features is inputted into the trained neural network (for example, the neural network as described in the foregoing).

In this way, a group of vectors representing the voiceprint information may be obtained, and the group of vectors consists of multiple frames corresponding to the voiceprint information. At the same time, extracting the voiceprint information using the bottleneck feature of the neural network can be adapted to extract voiceprint information of a short-time voice segment (for example, 3 s) in a better manner. One of ordinary skill in the art can be familiar with definition and extraction approaches of a bottleneck feature of a neural network based on existing technologies, and details thereof are not redundantly described herein.

Furthermore, in implementations, mapping the frame vectors of the bottleneck feature of the neural network into the single-frame voiceprint expression vector may include weighting the frame vectors of the bottleneck feature of the neural network to calculate the single-frame voiceprint expression vector corresponding to the bottleneck feature of the neural network. In implementations, frames of the bottleneck feature of the neural network may be weighted and then an average value thereof is taken (for example, a same weight or a predetermined different weight may be applied to each frame of the bottleneck feature of the neural network, and an average value is taken after weighting), to calculate the single-frame voiceprint expression vector. Alternatively, window function weighting may be performed on the frame vectors of the bottleneck feature of the neural network to calculate the single-frame voiceprint expression vector. In implementations, a single-frame voiceprint expression vector is an expression or representation of information included in the frame vectors of the bottleneck feature of the neural network, and the single-frame voiceprint expression vector includes or corresponds to an abstraction of the voiceprint information that is extracted.

In implementations, mapping the frame vectors of the bottleneck feature of the neural network into the single-frame voiceprint expression vector may include constructing an i-vector model for the frame vectors of the bottleneck feature of the neural network, and calculating the single-frame voiceprint expression vector corresponding to the bottleneck feature of the neural network using the i-vector model. In this implementation, the frame vectors of the bottleneck feature of the neural network may be modeled by using an existing i-vector to calculate an i-vector voiceprint expression using the i-vector model, to serve as the single-frame voiceprint expression vector. In this implementation, the process of extracting a voiceprint is more complicated as compared with the previous implementation. However, due to the characteristic of the bottleneck feature of the neural network, voiceprint information of a short-time voice segment and a voice segment in a noisy environment extracted using this implementation has a better performance than voiceprint information extracted using a conventional i-vector.

Figure 3:
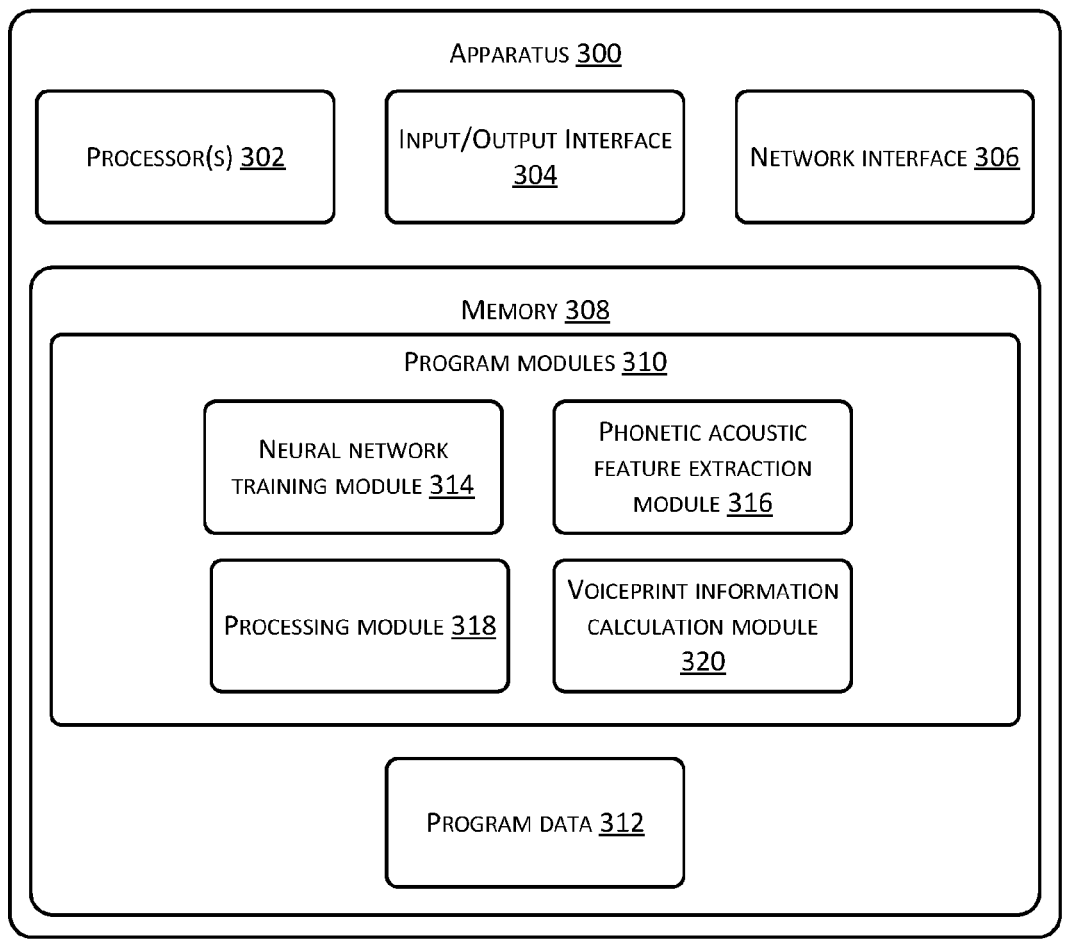
FIG. 3 is a modular diagram of a neural network-based voiceprint information extraction apparatus according to an embodiment of the present disclosure.

FIG. 3 shows an example neural network-based voiceprint information extraction apparatus 300 according to the present disclosure, to which the neural network structure shown in FIG. 1 is also applicable. In implementations, the apparatus 300 may include one or more processors 302, an input/output (I/O) interface 304, a network interface 306, and memory 308.

The memory 308 may include a form of computer-readable media, e.g., a non-permanent storage device, random-access memory (RAM) and/or a nonvolatile internal storage, such as read-only memory (ROM) or flash RAM. The memory 308 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves. For the ease of description, the system is divided into various types of units based on functions, and the units are described separately in the foregoing description. Apparently, the functions of various units may be implemented in one or more software and/or hardware components during an implementation of the present disclosure.

The memory 308 may include program modules 310 and program data 312. In implementations, the program modules 310 may include a neural network training module 314, a phonetic acoustic feature extraction module 316, a processing module 318, and a voiceprint information calculation module 320.

In implementations, prior to extracting voiceprint information, the neural network training module 314 may train a neural network, for example, using a GPU acceleration to quickly train the neural network. For example, the neural network training module 314 may use phonetic acoustic features (which may be extracted using the phonetic acoustic feature extraction module 316) extracted from training voice segments as input data of the neural network; use a class label corresponding to the training voice segments as output data of the neural network; and train a voiceprint model by classifying the input data using the neural network and comparing correspondence relationships between classification results and the output data.

In implementations, a speaker is used as a classification label, that is, one speaker corresponds to at least one training voice segment. An approach of training the neural network may include inputting a large number of training voice segments into the neural network and performing classification by the neural network; marking a classification as one if the neural network classifies a training voice segment into a corresponding speaker (i.e., a classification result corresponds to output data); marking the classification as zero if the neural network fails to classify the training voice segment into the corresponding speaker (i.e., the classification result does not correspond to the output data); and substituting the input data into the neural network again with reference to classification labels for analytic training, after all the training voice segments are classified in this manner, until the neural network can perform classification accurately or a classification accuracy thereof exceeds a preset threshold, and then setting the neural network as a voiceprint model.

In implementations, the phonetic acoustic feature extraction module 316 may extract a phonetic acoustic feature from an input voice segment. The processing module 318 may input the phonetic acoustic feature into the voiceprint model that is trained based on the neural network, and extract a bottleneck feature of the neural network in the voiceprint model. The voiceprint information calculation module 320 may map frame vectors of the bottleneck feature of the neural network into a single-frame voiceprint expression vector, which is served as voiceprint information corresponding to the input voice segment.

In implementations, the voice segment may include a section of continuous speech, for example, a sentence, a paragraph, and the like. The phonetic acoustic feature may include a Mel Frequency Cepstrum Coefficient (MFCC), a Perceptual Linear Prediction (PLP) Coefficient, a Filter Bank Feature, etc., of the voice segment. Apparently, the phonetic acoustic feature may also be original or raw speech data of the voice segment.

After the extracted phonetic acoustic feature corresponding to the voice segment is inputted into the voiceprint model, the voiceprint model may process the phonetic acoustic feature according to one or more rules that are defined in the previous training. For example, the phonetic acoustic feature sequentially passes through an input layer, a bidirectional recurrent neural network layer, a convolutional neural network layer, and a fully connected layer for analysis.

In implementations, for the voice segment from which voiceprint information needs to be extracted, the extracted feature is a bottleneck feature of the neural network, that is, an output of a fully connected layer in the voiceprint model. In this way, a group of vectors representing the voiceprint information may be obtained, and the group of vectors consists of multiple frames corresponding to the voiceprint information. At the same time, extracting the voiceprint information using the bottleneck feature of the neural network can be adapted to extract voiceprint information of a short-time voice segment (for example, 3 s) in a better manner. One of ordinary skill in the art can be familiar with definition and extraction approaches of a bottleneck feature of a neural network based on existing technologies, and details thereof are not redundantly described herein.

In implementations, the voiceprint information calculation module 320 may further weight the frame vectors of the bottleneck feature of the neural network to calculate the single-frame voiceprint expression vector corresponding to the bottleneck feature of the neural network. In implementations, frames of the bottleneck feature of the neural network may be weighted and then an average value thereof is taken (for example, a same weight or a predetermined different weight may be applied to each frame of the bottleneck feature of the neural network, and an average value is taken after weighting), to calculate the single-frame voiceprint expression vector. Alternatively, window function weighting may be performed on the frame vectors of the bottleneck feature of the neural network to calculate the single-frame voiceprint expression vector.

In implementations, the voiceprint information calculation module 320 may further construct an i-vector model for the frame vectors of the bottleneck feature of the neural network, and calculate the single-frame voiceprint expression vector corresponding to the bottleneck feature of the neural network using the i-vector model. In this implementation, the frame vectors of the bottleneck feature of the neural network may be modeled by using an existing i-vector to calculate an i-vector voiceprint expression using the i-vector model, to serve as the single-frame voiceprint expression vector. In this implementation, the process of extracting a voiceprint is more complicated as compared with the previous implementation. However, due to the characteristic of the bottleneck feature of the neural network, voiceprint information of a short-time voice segment and a voice segment in a noisy environment extracted using this implementation has a better performance than voiceprint information extracted using a conventional i-vector.

In view of the above, the neural network-based voiceprint information extraction method and apparatus of the present disclosure extract voiceprint information from a voice segment through a voiceprint model trained based on a neural network, and thus processes of training the voiceprint model and extracting the voiceprint information are relatively simple. Moreover, due to the characteristics of the neural network, the voiceprint model can process a short-time voice segment and a voice segment in a noisy environment in a better manner. As such, the extracted voiceprint information has a better performance.

One skilled in the art can clearly understand that specific working processes of the apparatus, apparatus and module described above may be obtained with reference to corresponding processes in the foregoing method implementations, and are not repeatedly described herein, for the sake of clarity of description.

In the implementations provided in the present disclosure, it should be understood that the disclosed apparatuses and methods may be implemented in other manners. For example, the foregoing apparatus implementations are merely exemplary. For example, the foregoing division of modules is merely a division of logic functions, and may use another division manner during an actual implementation. For example, multiple modules or components may be combined or may be integrated into another apparatus, or some features may be omitted or not be executed. On the other hand, the disclosed or discussed mutual coupling or direct coupling or communication connection may be indirect coupling or communication connection implemented through some interfaces, apparatuses or modules, and may be in electrical, mechanical or other forms.

Modules described as separate components may or may not be physically separate. Components described as modules may or may not be physical modules, i.e., may be located at a single location, or distributed among multiple network modules. The objective of the solutions of the embodiments may be implemented by selecting some or all of modules thereof according to actual requirements.

In addition, functional modules in the implementations of the present disclosure may be integrated in a decision module. Alternatively, the modules may also exist as physically individual entities. Alternatively, two or more modules are integrated into a single module. The integrated module may be implemented in a form of hardware or in a form of a combination of hardware and software functional module(s).

The integrated module that is implemented in a form of a software functional module may be stored in a computer readable storage media. The software functional module is stored in a storage media, and includes a number of instructions used to enable computing device(s) (which may be a personal computer, a server, a network device, or the like) or processor(s) to execute a portion of operations of the example methods of the present disclosure. The storage media may include a USB flash disk, a mobile hard disk, a Read-Only Memory (ROM), a Random Access Memory (RAM), a magnetic disk, an optical disc, or other media that can store a program code.

Finally, it should be noted that the foregoing implementations are merely used for describing the technical solutions of the present disclosure, rather than limiting the present disclosure. Although the present disclosure is described in detail with reference to the foregoing implementations, one of ordinary skill in the art should understand that they can still make modifications on the technical solutions of the above implementations, or perform equivalent replacements on some of technical features. These modifications or replacements are not intended to make the essences of the corresponding technical solutions depart from the spirit and scope of the technical solutions of the implementations of the present disclosure.

What is claimed is:

1. A method comprising:
    training a neural network, the training the neural network including:
        using respective phonetic acoustic features extracted from training voice segments as input data of the neural network;
        using respective class labels corresponding to the training voice segments as output data of the neural network;
        classifying the input data using the neural network; and
        training a voiceprint model by comparing correspondence relationships between classification results and the output data;
    extracting a phonetic acoustic feature from an input voice segment;
    inputting the phonetic acoustic feature into the voiceprint model trained based on the neural network;
    extracting a bottleneck feature of the neural network in the voiceprint model; and
    mapping frame vectors of the bottleneck feature of the neural network into a single-frame voiceprint expression vector, the single-frame voiceprint expression vector being served as voiceprint information corresponding to the input voice segment.

2. The method of claim 1, wherein the mapping the frame vectors of the bottleneck feature of the neural network into the single-frame voiceprint expression vector comprises weighting the frame vectors of the bottleneck feature of the neural network to calculate the single-frame voiceprint expression vector corresponding to the bottleneck feature of the neural network.

3. The method of claim 1, wherein the mapping the frame vectors of the bottleneck feature of the neural network into the single-frame voiceprint expression vector comprises:
    constructing an i-vector model for the frame vectors of the bottleneck feature of the neural network; and
    calculating the single-frame voiceprint expression vector corresponding to the bottleneck feature of the neural network using the i-vector model.

4. The method of claim 1, wherein the neural network comprises an input layer, a bidirectional recurrent neural network layer, a fully connected layer, and an output layer.

5. The method of claim 4, wherein the bidirectional recurrent neural network layer includes a forward propagation layer and a backward propagation layer.

6. The method of claim 1, wherein the neural network comprises an input layer, a bidirectional recurrent neural network layer, a convolutional neural network layer, a fully connected layer, and an output layer.

7. The method of claim 6, wherein the bottleneck feature of the neural network comprises an output of the phonetic acoustic feature in the fully connected layer of the voiceprint model.

8. The method of claim 1, further comprising analyzing the phonetic acoustic feature of a current time frame using forward and backward time frames together in a time sequence.

9. An apparatus comprising:
one or more processors;
memory;
a neural network training module stored in the memory and executable by the one or more processors to:
  use respective phonetic acoustic features extracted from training voice segments as input data of a neural network;
  use respective class labels corresponding to the training voice segments as output data of the neural network;
  classify the input data using the neural network; and
  train a voiceprint model by comparing correspondence relationships between classification results and the output data;
a phonetic acoustic feature extraction module stored in the memory and executable by the one or more processors to extract one or more phonetic acoustic features from an input voice segment;
a processing module stored in the memory and executable by the one or more processors to input the one or more phonetic acoustic features into the voiceprint model trained based on the neural network, and extract a bottleneck feature of the neural network in the voiceprint model; and
a voiceprint information calculation module stored in the memory and executable by the one or more processors to map frame vectors of the bottleneck feature of the neural network into a single-frame voiceprint expression vector, the single-frame voiceprint express vector being served as voiceprint information corresponding to the input voice segment.

10. The apparatus of claim 9, wherein the voiceprint information calculation module is further executable by the one or more processors to weight the frame vectors of the bottleneck feature of the neural network to calculate the single-frame voiceprint expression vector corresponding to the bottleneck feature of the neural network.

11. The apparatus of claim 9, wherein the voiceprint information calculation module is further executable by the one or more processors to construct an i-vector model for the frame vectors of the bottleneck feature of the neural network, and calculate the single-frame voiceprint expression vector corresponding to the bottleneck feature of the neural network using the i-vector model.

12. The apparatus of claim 9, wherein the neural network comprises an input layer, a bidirectional recurrent neural network layer, a fully connected layer, and an output layer.

13. The apparatus of claim 9, wherein the neural network comprises an input layer, a bidirectional recurrent neural network layer, a convolutional neural network layer, a fully connected layer, and an output layer.

14. The apparatus of claim 13, wherein the bottleneck feature of the neural network comprises an output of the phonetic acoustic feature in the fully connected layer of the voiceprint model.

15. One or more computer-readable media storing executable instructions that, when executed by one or more processors, cause the one or more processors to perform acts comprising:
training a neural network, the training the neural network including:
  using respective phonetic acoustic features extracted from training voice segments as input data of the neural network;
  using respective class labels corresponding to the training voice segments as output data of the neural network;
  classifying the input data using the neural network; and
  training a voiceprint model by comparing correspondence relationships between classification results and the output data;
extracting a phonetic acoustic feature from an input voice segment;
inputting the phonetic acoustic feature into the voiceprint model trained based on the neural network;
extracting a bottleneck feature of the neural network in the voiceprint model; and
mapping frame vectors of the bottleneck feature of the neural network into a single-frame voiceprint expression vector, the single-frame voiceprint expression vector being served as voiceprint information corresponding to the input voice segment.

16. The one or more computer-readable media of claim 15, wherein the mapping the frame vectors of the bottleneck feature of the neural network into the single-frame voiceprint expression vector comprises weighting the frame vectors of the bottleneck feature of the neural network to calculate the single-frame voiceprint expression vector corresponding to the bottleneck feature of the neural network.

17. The one or more computer-readable media of claim 15, wherein the mapping the frame vectors of the bottleneck feature of the neural network into the single-frame voiceprint expression vector comprises:
  constructing an i-vector model for the frame vectors of the bottleneck feature of the neural network; and
  calculating the single-frame voiceprint expression vector corresponding to the bottleneck feature of the neural network using the i-vector model.

18. The one or more computer-readable media of claim 15, wherein the neural network comprises an input layer, a bidirectional recurrent neural network layer, a convolutional neural network layer, a fully connected layer, and an output layer.

19. The one or more computer-readable media of claim 15, wherein the neural network comprises an input layer, a bidirectional recurrent neural network layer, a fully connected layer, and an output layer.

20. The one or more computer-readable media of claim 19, wherein the bottleneck feature of the neural network comprises an output of the phonetic acoustic feature in the fully connected layer of the voiceprint model.

* * * * *